United States Patent [19]
Bergamini et al.

[11] Patent Number: 5,586,575
[45] Date of Patent: Dec. 24, 1996

[54] ELECTROPNEUMATIC CONVERTER WITH SOLENOID VALVE CONTROL

[75] Inventors: Giorgio Bergamini; Venanzio Mininni, both of Bari, Italy

[73] Assignee: Nuovopignone- Industrie Meccaniche e Fonderia S.p.A., Florence, Italy

[21] Appl. No.: 260,918

[22] Filed: Jun. 15, 1994

[30] Foreign Application Priority Data

Jun. 22, 1993 [IT] Italy .................................. MI93A1335

[51] Int. Cl.⁶ .................................................... G05D 16/20
[52] U.S. Cl. .......................... 137/488; 137/85; 137/116.5; 251/29
[58] Field of Search .................... 251/29, 30.01, 251/26; 137/85, 116.5, 488

[56] References Cited

U.S. PATENT DOCUMENTS

| | | | |
|---|---|---|---|
| 3,452,775 | 7/1969 | Alberani | 251/29 X |
| 4,898,200 | 2/1990 | Odajima et al. | 137/116.5 X |
| 5,310,111 | 5/1994 | Linck | 251/29 X |
| 5,370,152 | 12/1994 | Carey et al. | 137/116.5 X |

FOREIGN PATENT DOCUMENTS

| | | |
|---|---|---|
| 0093340 | 11/1983 | European Pat. Off. . |
| 1116084 | 5/1962 | Germany . |
| 2756582 | 6/1979 | Germany . |
| 3041339 | 6/1982 | Germany . |
| WO87/00588 | 1/1987 | WIPO . |

*Primary Examiner*—Kevin Lee
*Attorney, Agent, or Firm*—Oblon, Spivak, McClelland, Maier & Neustadt, P.C.

[57] ABSTRACT

An electropneumatic converter controlled by solenoid valves, in which the solenoid valves are connected respectively to the feed pressure and to atmosphere, each via a pressure regulator controlled by a differential pressure measurement device connected across a respective solenoid valve, so as to maintain a constant pressure difference across the solenoid valves.

5 Claims, 2 Drawing Sheets

ELECTROPNEUMATIC CONVERTER WITH SOLENOID VALVE CONTROL

BACKGROUND OF THE INVENTION

1. Field of the Invention

This invention relates to an electropneumatic converter with solenoid valve control which by imposing a constant minimum pressure difference across each of the two control solenoid valves not only results in an evident considerable reduction in the energy required for operating said solenoid valves but also results in a substantially linear variation in converter output pressure with solenoid valve opening time, independently of feed pressure variations and the value of the converter output pressure, besides maintaining the dead times of the solenoid valves always constant with consequent improvement in control precision and repeatability, in particular for small solenoid valve opening times.

2. Discussion of Background

As is well known, the pneumatic actuators of process valves are controlled by electropneumatic converters able to modulate their output pressure on the basis of electrical command signals. Various types of electropneumatic converters are already known in the state of the art.

In one of the known types, namely the type controlled by solenoid valves, a loading solenoid valve connected to the feed pressure and an unloading solenoid valve connected to atmosphere regulate the pressure within a capacitive chamber connected to them in series. The capacitive chamber pressure is then used to control a booster unit which is connected to the feed pressure, its purpose being to amplify the output flow rate from the converter to the extent necessary for controlling the connected actuators. Finally, to prevent the large movements of the moving element of the booster being able to vary the volume of the capacitive chamber with consequent undesirable variation in the pressure of this latter, a pressure repeater comprising a separation membrane, a restriction and a nozzle-plate system is interposed between the chamber and the booster.

Such a known converter has however the serious drawback that the output pressure signal does not vary linearly with the actuation or opening time of the solenoid valves in that it depends strongly on both the feed pressure and the value of the output pressure. This dependency means that the solenoid valves have to operate several times in order, by successive approximations, to achieve the required output pressure, with consequent considerable energy consumption. The drawbacks substantially derive from the fact that the pressure difference across the two solenoid valves varies depending on the converter operating conditions.

This variation in the pressure difference results in the further drawbacks that a fairly large operating force for the solenoid valves has to be available, with the consequent need for high electrical powers in play, and that the dead time of the solenoid valves, ie the time interval between the energization and the response of the solenoid valves, also varies, with consequent behaviour non-repeatability and poor operating precision of the solenoid valves, in particular for small opening times thereof.

SUMMARY OF THE INVENTION

The object of the present invention is to obviate the drawbacks by providing an electropneumatic converter with solenoid valve control which has a linear characteristic, ie produces an output pressure which varies linearly with the activation time of the solenoid valves, the operation of which is not influenced either by the feed pressure or by the value of the output pressure, requires minimum activation energy and provides pressure values which are always repeatable even for small solenoid valve opening times.

This is substantially attained in that the pressure differences across the solenoid valves are maintained constant at very low values, each by means of a device which measures the pressure difference across the solenoid valve and controls a pressure regulator so that it maintains the pressure difference constant. More specifically, the electropneumatic converter with solenoid valve control, comprising two solenoid valves for loading and respectively unloading a capacitive chamber arranged in series with the solenoid valves and correspondingly connected by these to the feed pressure and to atmosphere, the capacitive chamber being connected in series with a pressure repeater consisting substantially of a membrane separating the capacitive chamber from the repetitive pressure chamber which is connected to the feed pressure via a restriction and to atmosphere via a nozzle-plate system, the pressure of the repetitive chamber being used to control the moving element of a booster unit modulating the output chamber pressure by means of a spring-loaded valving member connecting the output chamber pressure either to the feed pressure or to atmosphere, is characterised according to the present invention in that the loading and unloading solenoid valves are connected respectively to the feed pressure and to atmosphere each via a pressure regulator controlled by a differential pressure measurement device connected across the relative solenoid valve such as to maintain the pressure difference across the solenoid valve constant.

According to a preferred embodiment of the present invention, the object of maintaining the pressure difference across the solenoid valves constant is achieved not by the considerable constructional complication of adding two separate external pressure regulators and differential pressure measurement devices, but by adding two simple biasing springs and suitably modifying the pneumatic circuit of the converter.

More specifically, control of the pressure difference across the unloading solenoid valve is achieved by the actual pressure repeater but modified by adding into its repetitive pressure chamber a spring acting on the separation membrane to create within the repetitive pressure chamber a pressure lower than that of the capacitive chamber, ie to create across the separation membrane a pressure difference, maintained constant by the nozzle-plate restriction system, which is equal to the thrust exerted by the spring. In addition the outlet of the unloading solenoid valve is no longer connected to atmosphere but to the repetitive chamber at reduced pressure so that the constant pressure difference is established across the unloading solenoid valve. Again, control of the pressure difference across the other solenoid valve, ie the loading solenoid valve, is achieved by the modified pressure repeater together with the actual booster unit, which is however modified by the addition of a second spring acting on the moving element of the booster unit from the control chamber of the moving element and creating a constant pressure difference across the moving element, ie between the converter output pressure and the control chamber pressure which is equal to that of the repetitive chamber of the pressure repeater. In addition, the inlet of the loading solenoid valve is no longer connected to the feed pressure but to the converter output pressure, so that as the pressure differences across respectively the pressure repeater and the booster unit are constant, the difference between the converter output pressure and the pressure within the capacitive chamber, which represents the pressure difference across the loading solenoid valve, will also evidently be constant.

Hence, the pressure regulators and the differential pressure measurement devices for the loading and unloading solenoid valves are formed respectively by the actual pressure repeater, the repetitive pressure chamber of which is connected to the outlet of the unloading solenoid valve, in which chamber a spring is made to act on the separation membrane in the sense of urging it towards the capacitive pressure chamber, and by the actual booster, the moving element of which is biased by a second spring towards the output chamber which is connected to the inlet of the loading solenoid valve.

According to a further preferred embodiment of the present invention, the second spring is preloaded with the load necessary to obtain a pressure difference between the output chamber and the control chamber which is double that which the other spring determines between the capacitive chamber and the repetitive chamber.

In this manner the considerable advantage is achieved of having the same pressure difference across both the solenoid valves, this facilitating the control of the electropneumatic converter. Finally according to a further preferred embodiment of the present invention, the restriction in the pressure repeater no longer connects the repetitive chamber to the feed pressure but instead to the output pressure, ie the restriction in the pressure repeater is connected to the converter output chamber, feed to the repeater being ensured by modulating the the converter feed valving member.

In this manner a certain improvement in the electropneumatic converter functionality is achieved in that the restriction is now subjected to a constant pressure difference by the effect of the springs as already explained, and hence operates with a substantially constant volumetric throughput, this resulting in a considerable reduction in the movement of the plate-nozzle system, with evident consequent increase in the precision of the repeater.

BRIEF DESCRIPTION OF THE DRAWINGS

The invention is further clarified hereinafter with reference to the accompanying drawings, which illustrate preferred embodiments thereof by way of non-limiting example only, in that technical or constructional modifications can be made thereto without leaving the scope of the present invention.

In the drawings.

DESCRIPTION OF THE PREFERRED EMBODIMENTS

Figure 1:
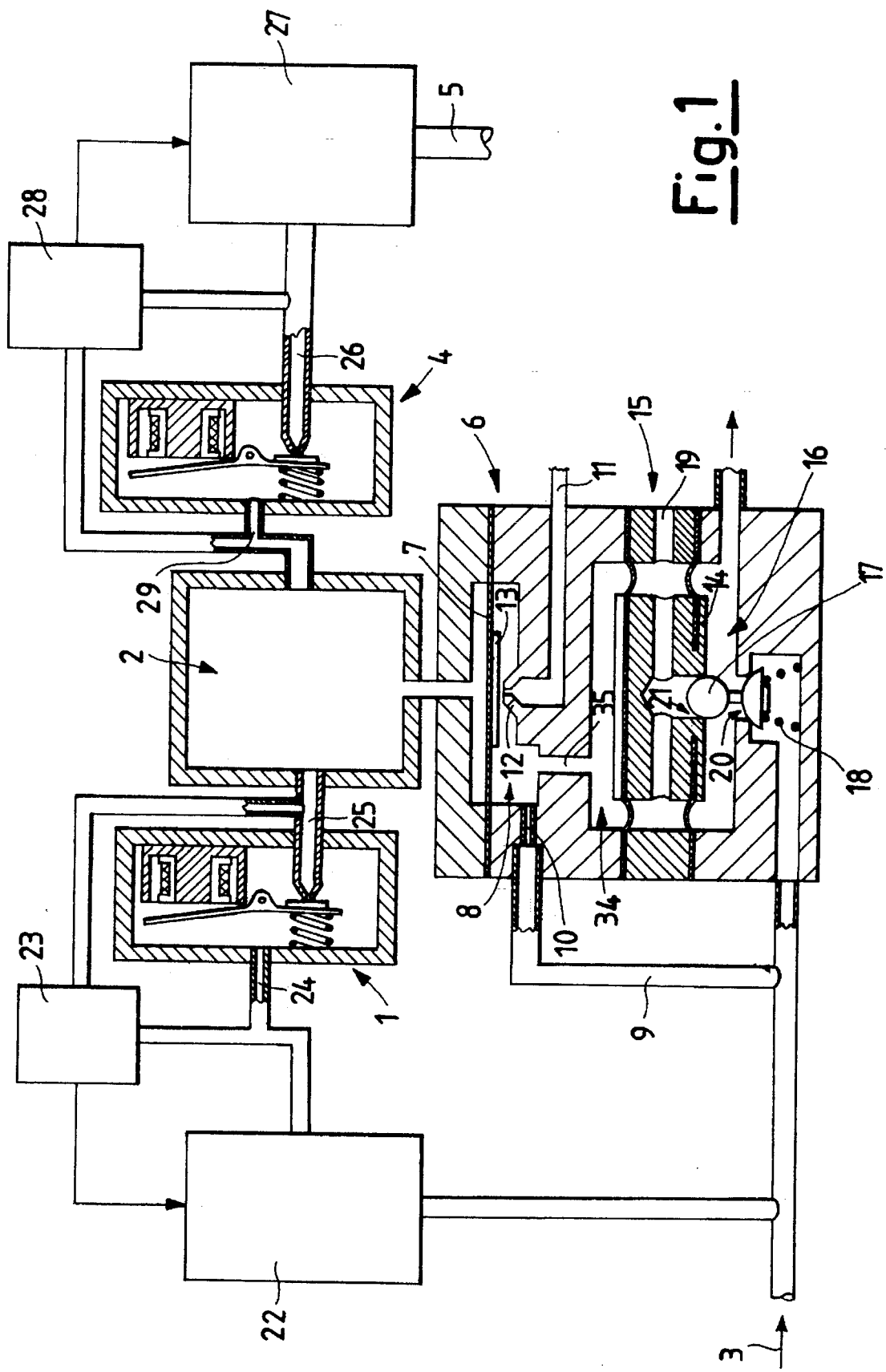
FIG. 1 is a partly sectional front view of an electropneumatic converter with solenoid valve control, formed in accordance with the present invention.

With reference to the figures, in which equivalent elements are indicated by the same reference numerals, 1 indicates the electropneumatic converter loading solenoid valve which feeds the capacitive chamber 2 with the feed pressure 3, the unloading solenoid valve 4 connecting said capacitive chamber 2 to atmosphere via the duct 5. The capacitive chamber 2 is connected in series with a pressure repeater 6 consisting substantially of a membrane 7 separating the capacitive chamber 2 from a repetitive pressure chamber 8, which is connected to the feed pressure 3 (see specifically FIG. 1) by the duct 9 via a restriction 10, and to atmosphere by the duct 11 via a system comprising a nozzle 12 and plate 13. The pressure $p_1$ in the repetitive chamber 8 is hence used in the control chamber 34 connected to the repetitive chamber 8 by the duct 35, to control the moving element 14 of a booster unit 15 modulating the $p_2$ in the output chamber 16 via the valving member 17 which is loaded by the spring 18 and connects the output chamber 16 either to feed pressure 3, when the valving member 17 is urged against the action of the spring 18 to open the feed port 20, or to atmosphere via the duct 19 when the movement of the moving element 14 opens the discharge port 21.

Again, the loading solenoid valve 1 is connected to the feed pressure 3 via a pressure regulator 22 controlled by a differential pressure measurement device 23 applied across the solenoid valve 1, ie between the inlet 24 and outlet 25 of the solenoid valve 1. In this manner the pressure difference across the solenoid valve is set and always remains constant.

Likewise the outlet 26 of the solenoid valve 4 is connected to the duct 5 discharging to atmosphere via a second pressure regulator 27 controlled by a further differential pressure measurement device 28 applied between the outlet 26 and the inlet 29 of the solenoid valve 4, so that a constant pressure difference is also set across the solenoid valve 4.

Figure 2:
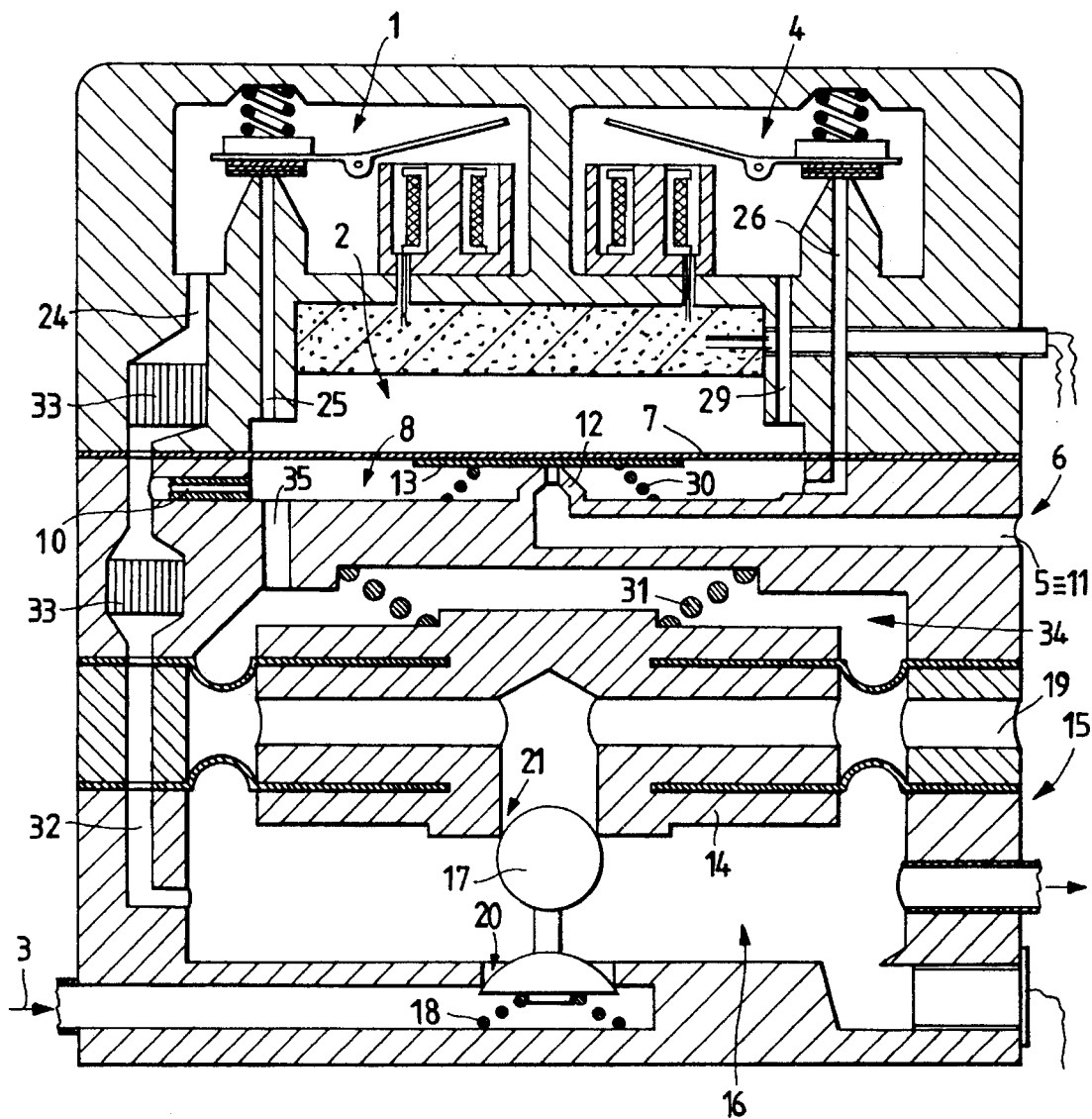
FIG. 2 is a front sectional view of an electropneumatic converter with solenoid valve control formed in accordance with a preferred embodiment of the present invention.

According to the preferred embodiment of FIG. 2, the function of the pressure regulators 22 and 27 and of the relative differential pressure measurement devices 23 and 28 is performed by the pressure repeater 6 in combination with the booster unit 15 by virtue of the fact that in the repetitive pressure chamber 8 a preloaded spring 30 is made to act on the separation membrane 7 in the sense of urging it towards the capacitive chamber 2, a second preloaded spring 31 being made to act within the control chamber 34 on the moving element 14 in the sense of urging this latter towards the converter output chamber 16, the output chamber 16 being connected, via the duct 32 provided with filters 33, to the inlet 24 of the loading solenoid valve 1, the repetitive pressure chamber 8 being connected to the outlet 26 of the loading solenoid valve 4.

In this manner, if the pressure in the capacitive chamber 2 is indicated by $p_3$, a constant pressure difference $p_3-p_1$ proportional to the preload of the spring 30 is established across the separation membrane 7 and consequently across the loading solenoid valve 4. Again, the pressure difference $p_2-p_1$ between the output chamber 16 and the repetitive chamber 8 is constant and proportional to the preload of the spring 31, so that the pressure difference $p_2-p_3$ between the output chamber 16 and the capacitive chamber 2 is evidently constant, as is consequently the pressure difference between the inlet 24 and outlet 25 of the loading solenoid valve 1.

According to a preferred embodiment, the spring 31 is preloaded with a load such as to obtain a pressure difference $p_2-p_1$ between the output chamber 16 and the control chamber 34 or repetitive chamber 8 which is double that ($p_3-p_1$) which the other spring 30 determines between the capacitive chamber 2 and the repetitive chamber 8 or control chamber 34. In this manner the pressure difference across the loading solenoid valve 1, ie $p_2-p_3$, is equal to the pressure difference across the unloading solenoid valve 4, ie $p_3-p_1$, as can be easily demonstrated.

Finally, the restriction 10 in the pressure repeater 6 is fed not by the feed pressure 3 but instead by the output pressure $p_2$ via said duct 32. In this manner across said restriction 10 there is a pressure drop $p_2-p_1$ which is always constant so that the volumetric flow rate through the restriction will be substantially constant, which by drastically reducing the movements of the system comprising the plate 13 and nozzle 12 provides a considerable increase in the precision of the repeater.

The operation of the electropneumatic converter as further described with reference to FIG. 1 of the specification.

The solenoid valve (1) has the function to keep a well determined pressure value relative to feed pressure (3) within the capacitive chamber (2). When the measure of differential pressure by (23) reveals that the pressure in the chamber (2) is lower than the set value, the pressure regulator (22) energizes the solenoid of valve (1) and opens its duct (25): the pressure within the chamber (2) is increased up to the set value of the above differential pressure.

Likewise, the solenoid valve (4) has the function to keep a well determined pressure value relative to the external pressure in (5) within the capacitive chamber. When the measure of differential pressure by (28) reveals that the relative pressure in the chamber (2) is higher than the set value, the pressure regulator (27) energizes the solenoid of valve (4) and opens its duct (26): the pressure within the chamber (2) is decreased down to the set value of above differential pressure.

The solenoid valves (1,4) are however individually energized in response to their differential pressure measurement devices.

The membrane (7), the dual diaphragm moving element (14) and the valving member (17) act in response only to the pressures exerted on their opposed parts; the energizing and deenergizing of the solenoid valves keep only the set value of differential pressure within the chamber (2), that pressure in any case has to be maintained slightly lower than that of feed pressure (3).

It is noted that, even if repetitive pressure chamber (8) is always connected with the feed pressure (3) by conduit (9), the restriction (10) causes the transient phases to reach the equilibrium pressure with a significant delay. In other words, in the transient phases the pressure within repetitive pressure chamber (8) is lower than the feed pressure (3).

A cycle of the valve unit is described below. In the capacitive chamber (2) the pressure is kept slightly lower than the feed pressure (3), the chambers (8) and (34) are at a lower pressure as they have just been leaked by the opening of the nozzle (12). The fluid enters through the restriction (10) and the pressure within repetitive pressure chamber (8) and control chamber (34) is progressively increased to the value of the feed pressure (3). There are two possibilities:

a)—if the pressure within the output chamber (16) is still close to the value of feed pressure (3) the combined forces—opposed to the force exerted by the pressure in the control chamber (34)—of the pressure within the output chamber (16) and of the spring (18) prevail and maintain the moving element (14) in its upper position: the valve (17) remains closed. When the pressure value within the repetitive pressure chamber (8) exceeds the pressure value on the opposed face of membrane (7) exerted by the capacitive chamber (2), the membrane (7) rises and the fluid within (8) is leaked by nozzle (12): the pressure becomes again at a low value and the cycle is restarted.

b)—if the pressure within the output chamber (16) is significantly below the value of feed pressure (3) the combined forces—opposed to the force due to the pressure within the control chamber (34)—of the pressure within the output chamber (16) and of the spring (18) cannot prevail and cannot maintain the moving element (14) in its upper position: the valve (17) cannot remain closed. The pushing force of the pressure within the control chamber (34) prevails and the moving element (14) is pushed down, thus pushing the valving member (17) down and causing the port (20) to open. The feed pressure fluid (3) flows into output chamber (16) and establishes therein its pressure.

Now, the combined forces of the pressure within the chamber (16) and of the spring (18) prevail again and push the moving element (14) into its upper position: the valve (17) is closed again.

In case the pressure in the output chamber (16) becomes higher than the feed pressure (3)—due to possible fluctuations of the head pressure (3)—the stroke of the moving element (14) goes farther. The spherical body of the valving member (17) is stopped by its end stroke and detaches itself from its seat in the opening of the moving element (14), so discharging this overpressure through the port (21).

Also in this alternative b), when the pressure value within the repetitive pressure chamber (8) exceeds the pressure value on the opposed face of membrane (7) exerted by the capacitive chamber (2), the membrane (7) rises and the fluid within (8) is leaked by nozzle (12): the pressure becomes again at a low value and the cycle is restarted.

What is claimed as new and desired to be secured by Letters Patent of the United States is:

1. An electropneumatic converter with solenoid valve control, comprising a loading solenoid valve for loading and an unloading solenoid valve for unloading a capacitive chamber arranged in series with said solenoid valves and correspondingly connected by the loading solenoid valve to a feed pressure and by the unloading solenoid valve to atmosphere, said capacitive chamber being connected in series with a pressure repeater comprising a membrane separating said capacitive chamber from a repetitive pressure chamber which is connected to the feed pressure via a restriction and to atmosphere via a nozzle-plate system, the pressure of said repetitive pressure chamber being used to control a moving element of a booster unit modulating the output chamber pressure of an output chamber by means of a spring-loaded valving member connecting said output chamber pressure either to the feed pressure in the loading phase or to atmosphere in the unloading phase, characterized in that the loading solenoid valve is connected to the feed pressure via a first pressure regulator controlled by a first differential pressure measurement device connected across the loading solenoid valve such as to maintain the pressure difference across the loading solenoid valve constant and the unloading solenoid valve is connected to atmosphere via a second pressure regulator controlled by a second differential pressure measurement device connected across the unloading solenoid valve such as to maintain the pressure difference across the unloading solenoid valve constant.

2. An electropneumatic converter with solenoid valve control as claimed in claim 1, characterized in that said first and second pressure regulators and said first and second differential pressure measurement devices for said loading and unloading solenoid valves are formed respectively by the pressure repeater, the repetitive pressure chamber of which his connected to the outlet of said unloading solenoid valve, in which chamber a first spring is made to act on said membrane in the sense of urging it towards the capacitive pressure chamber, and by the booster unit, the moving element of which is biased by a second spring towards the output chamber which is connected to the inlet of the loading solenoid valve.

3. An electropneumatic converter with solenoid valve control as claimed in claim 2, characterized in that said second spring is preloaded with the load necessary to obtain a pressure difference between the output chamber and the control chamber which is double that which said first spring determines between the capacitive chamber and the repetitive pressure chamber.

4. An electropneumatic converter with solenoid valve control as claimed in claim 2, characterized in that said restriction communicates the pressure repeater with said output chamber, feed to the pressure repeater being ensured by modulating the said spring-loaded valving member.

5. An electropneumatic converter with solenoid valve control as claimed in claim 3, characterized in that said restriction communicates the pressure repeater with said output chamber, feed to the pressure repeater being ensured by modulating the said spring-loaded valving member.

* * * * *